United States Patent
Huang et al.

(10) Patent No.: US 10,070,419 B2
(45) Date of Patent: Sep. 4, 2018

(54) COMMUNICATIONS SYSTEM AND METHOD, AND DEVICE IN WHICH A CELLULAR NETWORK AND MILLIMETER WAVE-CELLULAR COMMUNICATIONS COEXIST

(71) Applicant: HUAWEI TECHNOLOGIES CO., LTD., Shenzhen, Guangdong (CN)

(72) Inventors: Lei Huang, Shanghai (CN); Yongming Liang, Shanghai (CN); Peng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 83 days.

(21) Appl. No.: 15/159,542

(22) Filed: May 19, 2016

(65) Prior Publication Data

US 2016/0270075 A1    Sep. 15, 2016

Related U.S. Application Data

(63) Continuation of application No. PCT/CN2013/087766, filed on Nov. 25, 2013.

(51) Int. Cl.
*H04W 72/04* (2009.01)
*H04W 60/00* (2009.01)
(Continued)

(52) U.S. Cl.
CPC .......... *H04W 72/0406* (2013.01); *H04L 5/14* (2013.01); *H04W 60/00* (2013.01);
(Continued)

(58) Field of Classification Search
CPC .............................................. H04W 72/0406
See application file for complete search history.

(56) References Cited

U.S. PATENT DOCUMENTS 9,439,096 B2 * 9/2016 Josiam ................ H04W 24/10
2011/0182174 A1   7/2011 Pi et al.
(Continued)

FOREIGN PATENT DOCUMENTS

CN   102098062 A   6/2011
CN   102884731 A   1/2013
(Continued)

OTHER PUBLICATIONS

Laurent Cariou (Orange Labs/France Telecom), Collaboration between 2.4/5 and 60 GHz, IEEE 802.11-10/0492r1, Apr. 30, 2010. total 19 pages.
(Continued)

*Primary Examiner* — Jason E Mattis
(74) *Attorney, Agent, or Firm* — Leydig, Voit & Mayer, Ltd.

(57) ABSTRACT

Embodiments of the present invention disclose a communications system, including: a cellular base station, a millimeter wave base station, and user equipment, where the cellular base station includes a first cellular band transceiver; the millimeter wave base station includes a second cellular band transceiver and a millimeter wave band transmitter; and the user equipment includes a third cellular band transceiver and a millimeter wave band receiver, where the third cellular band transceiver is configured to receive control plane data information sent by the first cellular band transceiver or the second cellular band transceiver by using a cellular band, and the millimeter wave band receiver is configured to receive user plane data information sent by the millimeter wave band transmitter by using a millimeter wave band. The embodiments of the present invention may reduce a cost of the user equipment.

10 Claims, 7 Drawing Sheets

(51) Int. Cl.
*H04L 5/14* (2006.01)
*H04W 76/15* (2018.01)
*H04W 88/06* (2009.01)
*H04W 88/10* (2009.01)

(52) U.S. Cl.
CPC ... *H04W 72/0413* (2013.01); *H04W 72/0446* (2013.01); *H04W 76/15* (2018.02); *H04W 88/06* (2013.01); *H04W 88/10* (2013.01)

(56) References Cited

U.S. PATENT DOCUMENTS

| | | | |
|---|---|---|---|
| 2011/0243040 A1 | 10/2011 | Khan et al. | |
| 2012/0320786 A1 | 12/2012 | Katayama et al. | |
| 2012/0320874 A1 | 12/2012 | Li et al. | |
| 2015/0004918 A1* | 1/2015 | Wang | H04W 88/02 455/73 |
| 2015/0009951 A1* | 1/2015 | Josiam | H04L 25/0224 370/330 |
| 2015/0270932 A1* | 9/2015 | Agiwal | H04L 1/1887 370/336 |
| 2016/0007371 A1* | 1/2016 | Pietraski | H04W 72/1263 370/315 |

FOREIGN PATENT DOCUMENTS

| | | |
|---|---|---|
| JP | 2012-170014 A | 9/2012 |
| RU | 2475968 C1 | 2/2013 |
| RU | 24759681 C1 | 2/2013 |
| WO | 2011037687 A1 | 3/2011 |
| WO | 2013/086410 A2 | 6/2013 |
| WO | 2013086164 A1 | 6/2013 |
| WO | 2013170169 A2 | 11/2013 |

OTHER PUBLICATIONS

Jiamin Chen et al., Huawei Technologies Co., Ltd., IEEE 802.11aj Usage Models Document, IEEE802.11-12/1145r0. Oct. 23, 2012. total 14 pages.
IEEE Std 802.11ad™-2012, IEEE Standard for Information technology—Telecommunications and information exchange between systems Local and metropolitan area networks—Specific requirements, Part 11: Wireless LAN Medium Access Control (MAC) and Physical Layer (PHY) Specifications Amendment 3: Enhancements for Very High Throughput in the 60 GHz Band. Dec. 28, 2012, total 628 pages.
Nokia Corporation, NSN,R2-130453,"Discussion on small cells dual connectivity", Nokia Corporation, Nokia Siemens Networks. 3GPP TSG-RAN WG2 Meeting #81, Malta, Jan. 28-Feb. 1, 2013. total 5 pages.
RWS-120010 3GPP WS DoCoMo, NTT DoCoMo, Requirements, Candidate Solutions & Technology Roadmap for LTE Rel-12 Onward, Ljubljana, Slovenia, Jun. 2012, total 27 pages.
Zhouyue Pi and Farooq Khan, "System Design and Network Architecture for a Millimeter-wave Mobile Broadband (MMB) System" Samoff Symposium, 2011 34th IEEE, May 2011. total 6 pages.

* cited by examiner

COMMUNICATIONS SYSTEM AND METHOD, AND DEVICE IN WHICH A CELLULAR NETWORK AND MILLIMETER WAVE-CELLULAR COMMUNICATIONS COEXIST

CROSS-REFERENCE TO RELATED APPLICATIONS

This application is a continuation of International Patent Application No. PCT/CN2013/087766, filed on Nov. 25, 2013, which is hereby incorporated by reference in its entirety.

TECHNICAL FIELD

The present invention relates to the communications field, and in particular, to a communications system and method, and a device.

BACKGROUND

Currently, in a communications system, most spectrum resources in a low frequency band (for example, a frequency band not higher than 3 GHz) that are applicable to a mobile communication device have already been allocated completely; however, a large quantity of spectrum resources in a high frequency band (for example, a frequency band: 3-300 GHz) have not been allocated for use. According to a definition by the International Telecommunication Union (International Telecommunication Union, ITU), the high frequency band is also referred to as a millimeter wave band. Currently, there are some solutions that use a millimeter wave band to perform cellular communication, and details are as follows:

Generally, a cellular base station and a millimeter wave base station are deployed on a network side, the cellular base station communicates with user equipment by using a cellular band, and the millimeter wave base station communicates with the user equipment by using a millimeter wave band. Therefore, two transceivers need to be deployed in the user equipment, where one transceiver is configured to communicate with the cellular base station, and the other transceiver is configured to communicate with the millimeter wave base station. In addition, because a frequency of the millimeter wave band is extremely high, a power requirement on and complexity of a transceiver configured to communicate by using the millimeter wave band are relatively high, which increases a cost of the user equipment.

SUMMARY

Embodiments of the present invention provide a communications system and method, and a device. In the embodiments of the present invention, user equipment needs to include only one cellular band transceiver and one millimeter wave band receiver to complete communication on a cellular band and a millimeter wave band, so as to resolve a problem that a power requirement on and complexity of a transceiver configured to communicate by using the millimeter wave band are relatively high and therefore increase a cost of the user equipment.

According to a first aspect, an embodiment of the present invention provides a communications system, including: a cellular base station, a millimeter wave base station, and user equipment, where the cellular base station is connected to the millimeter wave base station by using a transmission link, the cellular base station includes a first cellular band transceiver, the millimeter wave base station includes a second cellular band transceiver and a millimeter wave band transmitter, and the user equipment includes a third cellular band transceiver and a millimeter wave band receiver, where the third cellular band transceiver is configured to receive control plane data information sent by the first cellular band transceiver or the second cellular band transceiver by using a cellular band;

the third cellular band transceiver is configured to send uplink data to the first cellular band transceiver or the second cellular band transceiver by using a cellular band; and the millimeter wave band receiver is configured to receive user plane data information sent by the millimeter wave band transmitter by using a millimeter wave band.

In a first possible implementation manner of the first aspect, the cellular base station is further configured to allocate a first-bandwidth millimeter wave band to the user equipment, and the first cellular band transceiver is further configured to send first identification information of the first-bandwidth millimeter wave band to the third cellular band transceiver; or the millimeter wave base station is further configured to allocate a first-bandwidth millimeter wave band to the user equipment, and the second cellular band transceiver is further configured to send first identification information of the first-bandwidth millimeter wave band to the third cellular band transceiver; and the millimeter wave band receiver is further configured to receive, according to the first identification information, user plane data information sent by the millimeter wave band transmitter by using the first-bandwidth millimeter wave band.

With reference to the first possible implementation manner of the first aspect, in a second possible implementation manner of the first aspect, the user equipment communicates with the cellular base station on a cellular band in a frequency division duplex FDD manner, and/or the user equipment communicates with the millimeter wave base station on a cellular band in the FDD manner;

the third cellular band transceiver is further configured to receive control plane data information sent by the first cellular band transceiver or the second cellular band transceiver by using a second-bandwidth cellular band;

the third cellular band transceiver is further configured to send uplink data to the first cellular band transceiver or the second cellular band transceiver by using a third-bandwidth cellular band;

the cellular base station is further configured to increase, according to bandwidth of the first-bandwidth millimeter wave band and for the user equipment, specific bandwidth or a specific quantity of carriers for an uplink carrier of the third-bandwidth cellular band, and the first cellular band transceiver is further configured to send, to the third cellular band transceiver, second identification information of the third-bandwidth cellular band whose uplink carrier is increased; or the millimeter wave base station is further configured to increase, according to bandwidth of the first-bandwidth millimeter wave band and for the user equipment, specific bandwidth or a specific quantity of carriers for an uplink carrier of the third-bandwidth cellular band, and the second cellular band transceiver is further configured to send, to the third cellular band transceiver, second identification information of the third-bandwidth cellular band whose uplink carrier is increased; and the third cellular band transceiver is further configured to send, according to the second identification information, uplink data to the first cellular band transceiver or the second cellular band transceiver by using the third-bandwidth cellular band whose uplink carrier is increased.

With reference to the second possible implementation manner of the first aspect, in a third possible implementation manner of the first aspect, the cellular base station is further configured to pre-estimate, according to bandwidth of the first-bandwidth millimeter wave band, uplink load on the user equipment, and increase, according to the uplink load and for the user equipment, specific bandwidth or a specific quantity of carriers for an uplink carrier of the third-bandwidth cellular band; or the millimeter wave base station is further configured to pre-estimate, according to bandwidth of the first-bandwidth millimeter wave band, uplink load on the user equipment, and increase, according to the uplink load and for the user equipment, specific bandwidth or a specific quantity of carriers for an uplink carrier of the third-bandwidth cellular band.

With reference to the first possible implementation manner of the first aspect, in a fourth possible implementation manner of the first aspect, the user equipment communicates with the cellular base station on a cellular band in a time division duplex TDD manner, and/or the user equipment communicates with the millimeter wave base station on a cellular band in the TDD manner;

the third cellular band transceiver is further configured to receive control plane data information sent by the first cellular band transceiver or the second cellular band transceiver by using a fourth-bandwidth cellular band;

the third cellular band transceiver is further configured to send uplink data to the first cellular band transceiver or the second cellular band transceiver by using the fourth-bandwidth cellular band;

the cellular base station is further configured to adjust, according to bandwidth of the first-bandwidth millimeter wave band, a current uplink-downlink subframe configuration of the fourth-bandwidth cellular band to a target uplink-downlink subframe configuration;

the first cellular band transceiver is further configured to send information about the target uplink-downlink subframe configuration to the third cellular band transceiver;

the third cellular band transceiver is further configured to receive, according to the information about the target uplink-downlink subframe configuration, control plane data information sent by the first cellular band transceiver or the second cellular band transceiver by using the fourth-bandwidth cellular band with the target uplink-downlink subframe configuration; and the third cellular band transceiver is further configured to send, according to the information about the target uplink-downlink subframe configuration, uplink data to the first cellular band transceiver or the second cellular band transceiver by using the fourth-bandwidth cellular band with the target uplink-downlink subframe configuration.

With reference to the fourth possible implementation manner of the first aspect, in a fifth possible implementation manner of the first aspect, the cellular base station is further configured to pre-estimate, according to the bandwidth of the first-bandwidth millimeter wave band, uplink load on the user equipment, and adjust, according to the uplink load, the current uplink-downlink subframe configuration of the fourth-bandwidth cellular band to the target uplink-downlink subframe configuration.

According to a second aspect, an embodiment of the present invention provides user equipment, including: a memory, a controller, a cellular band transceiver, and a millimeter wave band receiver, where the memory is connected to the controller, and the controller is further connected separately to the cellular band transceiver and the millimeter wave band receiver; and the memory is configured to store a group of program code and user data, and the controller is configured to invoke programs stored in the memory so as to control the cellular band transceiver and the millimeter wave band receiver to perform the following operations:

receiving, by the cellular band transceiver, control plane data information sent by a cellular base station or a millimeter wave base station by using a cellular band;

sending, by the cellular band transceiver, uplink data to the cellular base station or the millimeter wave base station by using a cellular band; and receiving, by the millimeter wave band receiver, user plane data information sent by the millimeter wave base station by using a millimeter wave band.

In a first possible implementation manner of the second aspect, the cellular band transceiver is further configured to receive first identification information that is of a first-bandwidth millimeter wave band and that is sent by the cellular base station or the millimeter wave base station, where the first-bandwidth millimeter wave band is a millimeter wave band allocated to the user equipment by the cellular base station or the millimeter wave base station; and the millimeter wave band receiver is further configured to receive, according to the first identification information, user plane data information sent by the millimeter wave base station by using a millimeter wave band.

With reference to the first possible implementation manner of the second aspect, in a second possible implementation manner of the second aspect, the user equipment communicates with the cellular base station on a cellular band in an FDD manner, and/or the user equipment communicates with the millimeter wave base station on a cellular band in the FDD manner;

the cellular band transceiver is further configured to receive control plane data information sent by the cellular base station or the millimeter wave base station by using a second-bandwidth cellular band;

the cellular band transceiver is further configured to send uplink data to the cellular base station or the millimeter wave base station by using a third-bandwidth cellular band;

the cellular band transceiver is further configured to receive second identification information that is sent by the cellular base station or the millimeter wave base station and that is of the third-bandwidth cellular band whose uplink carrier is increased, where the third-bandwidth cellular band whose uplink carrier is increased is a third-bandwidth cellular band for which specific bandwidth or a specific quantity of carriers is increased, and the specific bandwidth or the specific quantity of carriers increased for the third-bandwidth cellular band is an uplink carrier increased for the user equipment by the cellular base station or the millimeter wave base station according to bandwidth of the first-bandwidth millimeter wave band; and the cellular band transceiver is further configured to send, according to the second identification information, uplink data to the cellular base station or the millimeter wave base station by using the third-bandwidth cellular band whose uplink carrier is increased.

With reference to the first possible implementation manner of the second aspect, in a third possible implementation manner of the second aspect, the user equipment communicates with the cellular base station on a cellular band in a TDD manner, and/or the user equipment communicates with the millimeter wave base station on a cellular band in the TDD manner;

the cellular band transceiver is further configured to receive control plane data information sent by the cellular base station or the millimeter wave base station by using a fourth-bandwidth cellular band;

the cellular band transceiver is further configured to send uplink data to the cellular base station or the millimeter wave base station by using the fourth-bandwidth cellular band;

the cellular band transceiver is further configured to receive information that is about a target uplink-downlink subframe configuration of the fourth-bandwidth cellular band and that is sent by the cellular base station, where the target uplink-downlink subframe configuration of the fourth-bandwidth cellular band is an uplink-downlink subframe configuration adjusted by the cellular base station according to bandwidth of the first-bandwidth millimeter wave band;

the cellular band transceiver is further configured to receive, according to the information about the target uplink-downlink subframe configuration, control plane data information sent by the cellular base station or the millimeter wave base station by using the fourth-bandwidth cellular band with the target uplink-downlink subframe configuration; and the cellular band transceiver is further configured to send, according to the information about the target uplink-downlink subframe configuration, uplink data to the cellular base station or the millimeter wave base station by using the fourth-bandwidth cellular band with the target uplink-downlink subframe configuration.

According to a third aspect, an embodiment of the present invention provides a base station, including: a memory, a controller, a millimeter wave band transmitter, and a cellular band transceiver, where the memory is connected to the controller, and the controller is further connected to the millimeter wave band transmitter;

the memory is configured to store a group of program code and user data, and the controller is configured to invoke a program stored in the memory so as to control the millimeter wave band transmitter to perform the following operation:

sending, by the millimeter wave band transmitter, user plane data information to user equipment by using a millimeter wave band; and the controller is further configured to invoke programs stored in the memory so as to control the cellular band transceiver to perform the following operations:

sending, by the cellular band transceiver, control plane data information to the user equipment by using a cellular band; and/or receiving, by the cellular band transceiver, uplink data sent by the user equipment by using a cellular band.

In a first possible implementation manner of the third aspect, the controller is further configured to allocate a first-bandwidth millimeter wave band to the user equipment;

the cellular band transceiver is further configured to send first identification information of the first-bandwidth millimeter wave band to the user equipment; and the millimeter wave band transmitter is further configured to send, according to the first identification information, user plane data information to the user equipment by using the first-bandwidth millimeter wave band.

With reference to the first possible implementation manner of the third aspect, in a second possible implementation manner of the third aspect, the user equipment communicates with the base station on a cellular band in an FDD manner;

the cellular band transceiver is further configured to send control plane data information to the user equipment by using a second-bandwidth cellular band; and/or the cellular band transceiver is further configured to receive uplink data sent by the user equipment by using a third-bandwidth cellular band;

the controller is further configured to increase, according to bandwidth of the first-bandwidth millimeter wave band and for the user equipment, specific bandwidth or a specific quantity of carriers for an uplink carrier of the third-bandwidth cellular band;

the cellular band transceiver is further configured to send, to the user equipment, second identification information of the third-bandwidth cellular band whose uplink carrier is increased; and the cellular band transceiver is further configured to receive, according to the second identification information, uplink data sent by the user equipment by using the third-bandwidth cellular band whose uplink carrier is increased.

According to a fourth aspect, an embodiment of the present invention provides a communications method, including:

receiving control plane data information sent by a cellular base station or a millimeter wave base station by using a cellular band, where the control plane data information includes first identification information of a millimeter wave band;

sending uplink data to the cellular base station or the millimeter wave base station by using a cellular band, where the uplink data includes feedback information of the millimeter wave band identified by the first identification information; and receiving user plane data information sent by the millimeter wave base station by using the millimeter wave band.

In a first possible implementation manner of the fourth aspect, the millimeter wave band includes a first-bandwidth millimeter wave band, where the first-bandwidth millimeter wave band a millimeter wave band allocated by the cellular base station or the millimeter wave base station;

before the sending uplink data to the cellular base station or the millimeter wave base station by using a cellular band, the method further includes:

receiving second identification information that is sent by the cellular base station or the millimeter wave base station and that is of a third-bandwidth cellular band whose uplink carrier is increased, where the third-bandwidth cellular band whose uplink carrier is increased is a third-bandwidth cellular band for which specific bandwidth or a specific quantity of carriers is increased, and the specific bandwidth or the specific quantity of carriers increased for the third-bandwidth cellular band is increased by the cellular base station or the millimeter wave base station according to the first-bandwidth millimeter wave band;

the receiving control plane data information sent by a cellular base station or a millimeter wave base station by using a cellular band includes:

receiving the control plane data information sent by the cellular base station or the millimeter wave base station by using a second-bandwidth cellular band; and the sending uplink data to the cellular base station or the millimeter wave base station by using a cellular band includes:

sending, according to the second identification information, the uplink data to the cellular base station or the millimeter wave base station by using the third-bandwidth cellular band whose uplink carrier is increased.

With reference to the fourth aspect, in a second possible implementation manner of the fourth aspect, the millimeter wave band includes a first-bandwidth millimeter wave band, where the first-bandwidth millimeter wave band a millimeter wave band allocated by the cellular base station or the millimeter wave base station;

before the receiving control plane data information sent by a cellular base station or a millimeter wave base station by using a cellular band, the method further includes:

receiving information that is about a target uplink-downlink subframe configuration of a fourth-bandwidth cellular band and that is sent by the cellular base station, where the target uplink-downlink subframe configuration of the fourth-bandwidth cellular band is an uplink-downlink subframe configuration adjusted by the cellular base station according to bandwidth of the first-bandwidth millimeter wave band;

the receiving control plane data information sent by a cellular base station or a millimeter wave base station by using a cellular band includes:

receiving, according to the information about the target uplink-downlink subframe configuration, control plane data information sent by the cellular base station or the millimeter wave base station by using the fourth-bandwidth cellular band with the target uplink-downlink subframe configuration; and the sending, uplink data to the cellular base station or the millimeter wave base station by using a cellular band includes:

sending, according to the information about the target uplink-downlink subframe configuration and the identification information, the uplink data to the cellular base station or the millimeter wave base station by using the fourth-bandwidth cellular band with the target uplink-downlink subframe configuration.

In the foregoing technical solutions, user equipment receives, by using a third cellular band transceiver, control plane data information sent by the first cellular band transceiver or the second cellular band transceiver by using a cellular band; sends, by using the third cellular band transceiver, uplink data to the first cellular band transceiver or the second cellular band transceiver by using a cellular band; and then receives, by using a millimeter wave band receiver, user plane data information sent by the millimeter wave band transmitter by using a millimeter wave band. Therefore, compared with the prior art in which user equipment needs to include one cellular band transceiver and one millimeter wave band transceiver, the user equipment needs to include only one cellular band transceiver and one millimeter wave band receiver to complete communication on a cellular band and a millimeter wave band, and in this embodiment of the present invention, a cost of the user equipment may be reduced.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In the embodiments of the present invention, a communications system may be specifically any communications system in which a cellular network coexists with millimeter wave-cellular communication, for example, a Long Term Evolution (Long Term Evolution, LTE) network system or a Worldwide Interoperability for Microwave Access (Worldwide Interoperability for Microwave Access, WiMax) system.

In addition, in the embodiments of the present invention, a cellular band may be specifically a low frequency band (for example, a frequency band not higher than 3 GHz).

Figure 1:
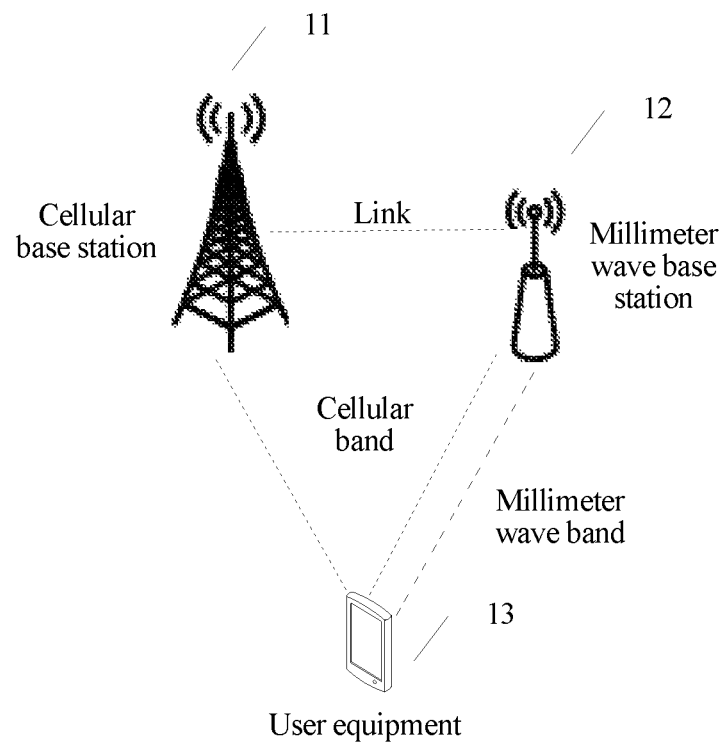
FIG. 1 is a schematic structural diagram of a communications system according to an embodiment of the present invention.
Figure 1:
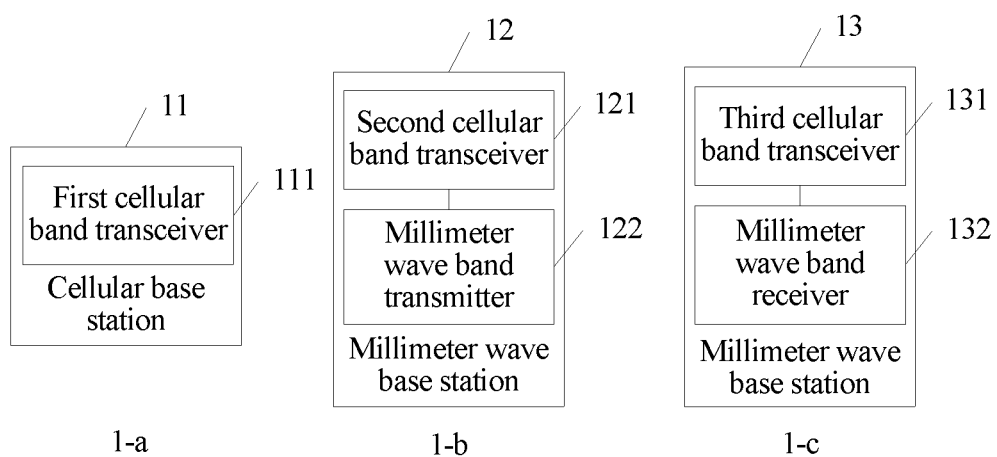

FIG. 1 is a schematic structural diagram of a communications system according to an embodiment of the present invention. As shown in FIG. 1, the communications system includes a cellular base station 11, a millimeter wave base station 12, and user equipment 13, where the cellular base station 11 is connected to the millimeter wave base station 12 by using a transmission link.

As shown in FIG. 1-a, the cellular base station 11 includes a first cellular band transceiver 111; as shown in FIG. 1-b, the millimeter wave base station 12 includes a second cellular band transceiver 121 and a millimeter wave band transmitter 122; as shown in FIG. 1-c, the user equipment 13 includes a third cellular band transceiver 131 and a millimeter wave band receiver 132, where the third cellular band transceiver 131 is configured to receive control plane data information sent by the first cellular band transceiver 111 or the second cellular band transceiver 121 by using a cellular band.

Specifically, the first cellular band transceiver 111 may send the control plane data information to the third cellular band transceiver 131 by using a cellular band, or the second cellular band transceiver 121 may send the control plane data information to the third cellular band transceiver 131 by using a cellular band. The control plane data information herein may be radio resource control (Radio Resource Control, RRC) signaling information transmitted between a base station and user equipment, broadcast channel (broadcasting channel, BCH) signaling transmitted by a base station to user equipment, or the like.

The third cellular band transceiver 131 is further configured to send uplink data to the first cellular band transceiver 111 or the second cellular band transceiver 121 by using a cellular band.

Specifically, the first cellular band transceiver 111 may receive control plane data information and user plane data information that are sent by the third cellular band transceiver 131 by using a cellular band, that is, the foregoing uplink data; or the second cellular band transceiver 121 may receive control plane data information and user plane data information that are sent by the third cellular band transceiver 131 by using a cellular band, that is, the foregoing uplink data.

The millimeter wave band receiver 132 is configured to receive user plane data information sent by the millimeter wave band transmitter 122 by using a millimeter wave band.

It should be noted that the foregoing system includes the cellular base station 11, the millimeter wave base station 12, and the user equipment 13, and specifically, the foregoing system may include at least one cellular base station 11, at least one millimeter wave base station 12, and at least one user equipment 13. That is, the foregoing cellular base station 11 may represent one or more cellular base stations, the foregoing millimeter wave base station 12 may represent one or more millimeter wave base stations, and the foregoing user equipment 13 may represent one or more user equipments. The foregoing uplink data may specifically include at least one of the following:

control plane data information and user plane data information.

In the foregoing technical solution, user equipment receives, by using a third cellular band transceiver, control plane data information sent by a first cellular band transceiver or a second cellular band transceiver by using a cellular band; sends, by using the third cellular band transceiver, uplink data to the first cellular band transceiver or the second cellular band transceiver by using a cellular band; and then receives, by using a millimeter wave band receiver, user plane data information sent by a millimeter wave band transmitter by using a millimeter wave band. Therefore, compared with the prior art in which user equipment needs to include one cellular band transceiver and one millimeter wave band transceiver, the user equipment needs to include only one cellular band transceiver and one millimeter wave band receiver to complete communication on a cellular band and a millimeter wave band, and in this embodiment of the present invention, a cost of the user equipment may be reduced.

Figure 2:
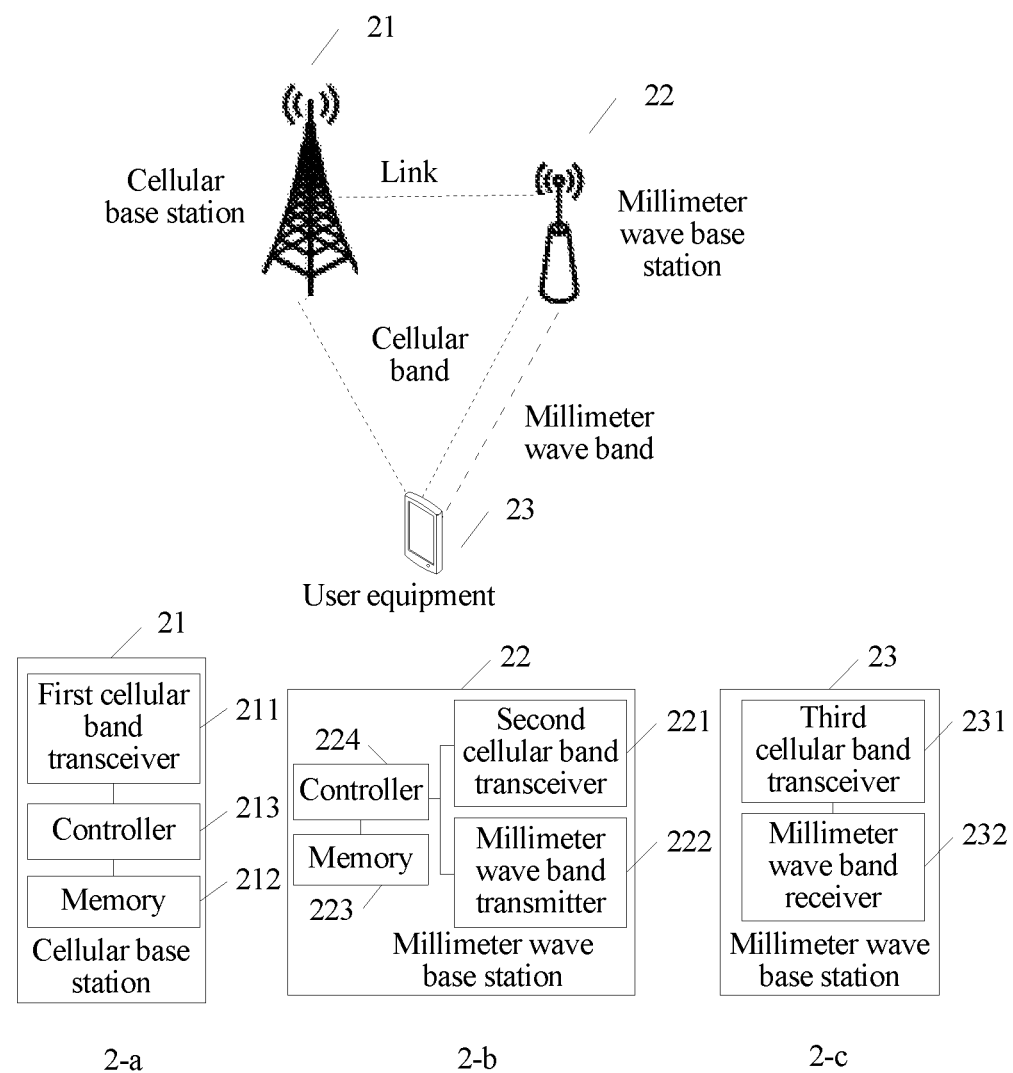
FIG. 2 is a schematic structural diagram of another communications system according to an embodiment of the present invention.

FIG. 2 is a schematic structural diagram of a communications system according to an embodiment of the present invention. As shown in FIG. 2, the communications system includes a cellular base station 21, a millimeter wave base station 22, and user equipment 23, where the cellular base station 21 is connected to the millimeter wave base station 22 by using a transmission link.

Specifically, the cellular base station 21 may be connected to the millimeter wave base station 22 by using a circuit, the cellular base station 21 may be connected to the millimeter wave base station 22 by using a fiber-wired backhaul link, or the cellular base station 21 may be connected to the millimeter wave base station 22 by using a millimeter wave wireless backhaul link. The cellular base station 21 may exchange data with the millimeter wave base station 22 by using the foregoing link. Specifically, the cellular base station 21 may send, by using the foregoing link to the millimeter wave base station 22, user plane data information that needs to be sent to the user equipment 23, and at the same time, may further send scheduling information of the user plane data information to the millimeter wave base station 22, that is, the cellular base station 21 may schedule, by using the scheduling information, the millimeter wave base station 22 to send the user plane data information to the user equipment 23.

As shown in FIG. 2-a, the cellular base station 21 includes a first cellular band transceiver 211; as shown in FIG. 2-b, the millimeter wave base station 22 includes a second cellular band transceiver 221 and a millimeter wave band transmitter 222; as shown in FIG. 2-c, the user equipment 23 includes a third cellular band transceiver 231 and a millimeter wave band receiver 232, where the third cellular band transceiver 231 is configured to receive control plane data information sent by the first cellular band transceiver 211 or the second cellular band transceiver 221 by using a cellular band.

The third cellular band transceiver 231 is further configured to send uplink data to the first cellular band transceiver 211 or the second cellular band transceiver 221 by using a cellular band.

Specifically, the first cellular band transceiver 211 may receive the control plane data information sent by the third cellular band transceiver 231 by using a cellular band, or the second cellular band transceiver 221 may receive the control plane data information sent by the third cellular band transceiver 231 by using a cellular band.

The millimeter wave band receiver 232 is configured to receive user plane data information sent by the millimeter wave band transmitter 222 by using a millimeter wave band.

As an optional implementation manner, the cellular base station 21 may be further configured to allocate a first-bandwidth millimeter wave band to the user equipment;

the first cellular band transceiver 211 may be further configured to send first identification information of the first-bandwidth millimeter wave band to the third cellular band transceiver; and the millimeter wave band receiver 232 may be further configured to receive, according to the first identification information, user plane data information sent by the millimeter wave band transmitter by using the first-bandwidth millimeter wave band.

Specifically, after the user equipment 23 establishes a connection to the cellular base station 21 by using a cellular band, the user equipment 23 may measure a millimeter wave band and feed channel state information of the millimeter wave band back to the cellular base station 21, and the cellular base station 21 then may allocate the foregoing first-bandwidth (for example, 200 MHz) millimeter wave band to the user equipment 23 according to a measurement result. The cellular base station 21 then may generate identification information, that is, the foregoing first identification information, of the foregoing first-bandwidth (for example, 200 MHz) millimeter wave band. Therefore, after receiving the identification information, the user equipment 23 may find the foregoing first-bandwidth millimeter wave band according to the identification information, and receive user plane data information at the millimeter wave band.

The foregoing first-bandwidth millimeter wave band may be specifically exclusively used for downlink data transmission of the user equipment 23. The foregoing first identification information may be specifically an ID number corresponding to the first-bandwidth millimeter wave band.

The cellular base station 21 may further specifically include a memory 212 and a controller 213, where the memory 212 is configured to store a group of program code, and the controller 213 is configured to invoke a program stored in the memory 212 so as to perform an operation of allocating the first-bandwidth millimeter wave band to the user equipment.

As an optional implementation manner, the millimeter wave base station 22 may be further configured to allocate a first-bandwidth millimeter wave band to the user equipment;

the second cellular band transceiver 221 may be further configured to send first identification information of the first-bandwidth millimeter wave band to the third cellular band transceiver; and the millimeter wave band receiver 231 may be further configured to receive, according to the first identification information, user plane data information sent by the millimeter wave band transmitter by using the first-bandwidth millimeter wave band.

Specifically, after the user equipment 23 establishes a connection to the cellular base station 21 by using a cellular band, the cellular base station 21 may send, to the millimeter wave base station 22, indication information of allocating bandwidth of the millimeter wave band to the user equipment 23, after receiving the indication information, the millimeter wave base station 22 may measure a millimeter wave band, and the millimeter wave base station 22 then may allocate the foregoing first-bandwidth (for example, 200 MHz) millimeter wave band to the user equipment 23 according to a measurement result.

The foregoing first-bandwidth band may be specifically exclusively used for downlink data transmission of the user equipment 23. The foregoing first identification information may be specifically an ID number corresponding to the first-bandwidth millimeter wave band.

The millimeter wave base station 22 may further specifically include a memory 223 and a controller 224, where the memory 223 is configured to store a group of program code, and the controller 224 is configured to invoke a program stored in the memory 223 so as to perform an operation of allocating the first-bandwidth millimeter wave band to the user equipment.

As an optional implementation manner, the user equipment 23 communicates with the cellular base station 21 on a cellular band in a frequency division duplex (Frequency Division Duplex, FDD) manner, and/or the user equipment 23 communicates with the millimeter wave base station 22 on a cellular band in the FDD manner. That is, the third cellular band transceiver 231 receives the foregoing control plane data information and sends the foregoing uplink data, which may be specifically performed in the FDD manner. Details may be as follows:

The third cellular band transceiver 231 may be further configured to receive the control plane data information sent by the first cellular band transceiver 211 or the second cellular band transceiver 221 by using a second-bandwidth cellular band; and the third cellular band transceiver 231 may be further configured to send the uplink data to the first cellular band transceiver 211 or the second cellular band transceiver 221 by using a third-bandwidth cellular band.

The foregoing second-bandwidth cellular band and the foregoing third-bandwidth cellular band may be specifically two cellular bands with independent bandwidth. For example, the third cellular band transceiver 231 receives control plane data information sent by the first cellular band transceiver 211 or the second cellular band transceiver 221 by using a downlink carrier with a 10 MHz bandwidth in cellular band, and the third cellular band transceiver 231 sends uplink data to the first cellular band transceiver 211 or the second cellular band transceiver 221 by using an uplink carrier with a 10 MHz bandwidth in another cellular band.

This implementation manner may be further implemented with reference to the foregoing implementation manner of the first-bandwidth millimeter wave band, and the cellular base station 21 may be further configured to increase, according to bandwidth of the first-bandwidth millimeter wave band and for the user equipment 23, specific bandwidth or a specific quantity of carriers for an uplink carrier of the third-bandwidth cellular band; and the first cellular band transceiver 211 may be further configured to send, to the third cellular band transceiver 231, second identification information of the third-bandwidth cellular band whose uplink carrier is increased.

For example, the foregoing third-bandwidth cellular band is bandwidth (for example, a 10 MHz-cellular band) allocated to the user equipment 23 by a system in advance; when the cellular base station 21 or the millimeter wave base station 22 allocates the foregoing first-bandwidth millimeter wave band to the user equipment 23, the cellular base station 21 pre-estimates, according to the bandwidth of the first-bandwidth millimeter wave band, uplink load on the user equipment 23, and then determines whether the third-bandwidth cellular band can bear the uplink load on the user equipment 23; when it is determined that the third-bandwidth cellular band cannot bear the uplink load on the user equipment 23, the cellular base station 21 may increase, according to the pre-estimated uplink load on the user equipment 23, an uplink carrier of the third-bandwidth cellular band.

The increasing an uplink carrier of the third-bandwidth cellular band may be specifically increasing bandwidth of the third-bandwidth cellular band, or increasing a quantity of uplink carriers of the third-bandwidth cellular band. For example, the third-bandwidth cellular band is a frequency band with a bandwidth of 10 MHz, and the cellular base station 21 may adjust the third-bandwidth cellular band to a frequency band with a bandwidth of 30 MHz, or aggregate multiple 10 MHz-cellular bands as the foregoing third-bandwidth cellular band.

The foregoing second identification information may be specifically an ID number of the third-bandwidth cellular band whose uplink carrier is increased. The first cellular band transceiver 211 sends the foregoing second identification information to the third cellular band transceiver 231, and may specifically send the foregoing second identification information to the third cellular band transceiver 231 by using radio resource control (Radio Resource Control, RRC) protocol signaling. That is, increasing an uplink carrier of the third-bandwidth cellular band for the user equipment 23 is implemented by using the RRC signaling.

Optionally, the cellular base station 21 may be further configured to pre-estimate, according to bandwidth of the first-bandwidth millimeter wave band, uplink load on the user equipment, and increase, according to the uplink load on the user equipment 23, specific bandwidth or a specific quantity of carriers for an uplink carrier of the third-bandwidth cellular band. For example, the cellular base station 21 may acquire, by using the bandwidth of the first-bandwidth millimeter wave band, an uplink load volume that is used by the user equipment 23 to feed back channel state information of a link on the millimeter wave band back, and increase, according to the uplink load volume for the user equipment 23, specific bandwidth or a specific quantity of carriers for an uplink carrier of the third-bandwidth cellular band. Therefore, configuring bandwidth of an uplink carrier of a cellular band or a quantity of uplink carriers may be implemented in a half-static manner according to load on a millimeter wave band and a cellular band.

In the implementation manner, the millimeter wave base station 22 may be further configured to increase, according to the bandwidth of the first-bandwidth millimeter wave band and for the user equipment 23, specific bandwidth or a specific quantity of carriers for an uplink carrier of the third-bandwidth cellular band;

the second cellular band transceiver 221 may be further configured to send, to the third cellular band transceiver 231, second identification information of the third-bandwidth cellular band whose uplink carrier is increased; and the third cellular band transceiver 231 is further configured to send, according to the second identification information, uplink data to the first cellular band transceiver 211 or the second cellular band transceiver 221 by using the third-bandwidth cellular band whose uplink carrier is increased.

Optionally, the millimeter wave base station 22 may be further configured to pre-estimate, according to bandwidth of the first-bandwidth millimeter wave band, uplink load on the user equipment, and increase, according to the uplink load on the user equipment 23, specific bandwidth or a specific quantity of carriers for an uplink carrier of the third-bandwidth cellular band. For example, the millimeter wave base station 22 may acquire, by using the bandwidth of the first-bandwidth millimeter wave band, an uplink load volume that is used by the user equipment 23 to feed back channel state information of a link on the millimeter wave band back, and increase, according to the uplink load volume for the user equipment 23, specific bandwidth or a specific quantity of carriers for an uplink carrier of the third-bandwidth cellular band.

For a specific implementation process, reference may be made to a process of implementing the cellular base station 21, which is not described herein repeatedly.

Figure 3:
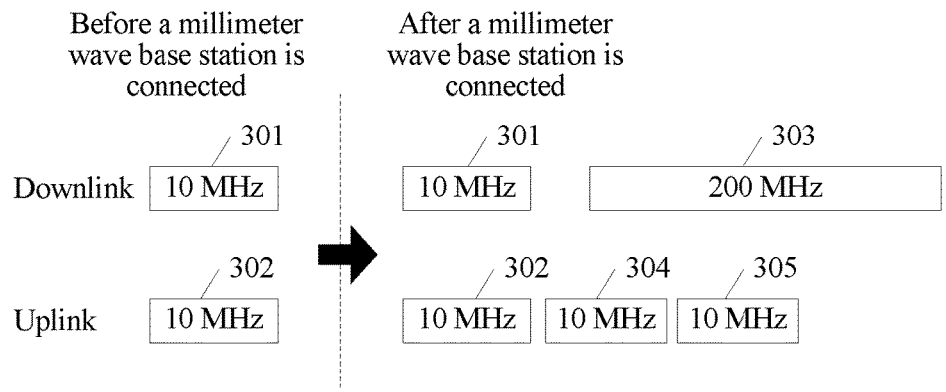
FIG. 3 is a schematic diagram of an optional frequency band according to an embodiment of the present invention.

Optionally, the implementation manner may be specifically shown in FIG. 3. Before the user equipment 23 accesses the millimeter wave base station 22, the user equipment 23 first communicates with the cellular base station 21 by using a downlink carrier 301 of 10 MHz and an uplink carrier 302 of 10 MHz. When the user equipment 23 needs to access the millimeter wave base station 22, the cellular base station 21 or the millimeter wave base station 22 allocates a downlink carrier 303 with a 200 MHz bandwidth in millimeter wave band to the user equipment, that is, after the user equipment 23 accesses the millimeter wave base station 22, downlink carriers of the user equipment 23 may include the downlink carrier 301 of 10 MHz and the downlink carrier 303 with a 200 MHz bandwidth in millimeter wave band. Because the downlink carrier 303 with a 200 MHz bandwidth in millimeter wave band is allocated to the user equipment 23, it may be difficult for the uplink carrier 302 of 10 MHz to meet a requirement of the uplink data of the user equipment 23; then, the cellular base station 21 or the millimeter wave base station 22 may increase a quantity of uplink carriers on a cellular band that is used by the user equipment 23. For example, an uplink carrier 304 of 10 MHz and an uplink carrier 305 of 10 MHz are increased, uplink carriers of the user equipment 23 may include the uplink carrier 302 of 10 MHz, the uplink carrier 304 of 10 MHz, and the uplink carrier 305 of 10 MHz.

As an optional implementation manner, the user equipment 23 communicates with the cellular base station 21 on a cellular band in a time division duplex (Time Division Duplex, FDD) manner, and/or the user equipment 23 communicates with the millimeter wave base station 22 on a cellular band in the TDD manner. That is, receiving, by the third cellular band transceiver 231, the foregoing control plane data information and sending the foregoing uplink data are performed by using a cellular band with same bandwidth. Details may be as follows:

The third cellular band transceiver 231 is further configured to receive the control plane data information sent by the first cellular band transceiver 211 or the second cellular band transceiver 221 by using a fourth-bandwidth cellular band; and the third cellular band transceiver is further configured to send uplink data to the first cellular band transceiver 211 or the second cellular band transceiver 221 by using the fourth-bandwidth cellular band.

For example, the third cellular band transceiver 231 receives control plane data information sent by the first cellular band transceiver 211 or the second cellular band transceiver 221 by using a downlink subframe in the fourth-bandwidth cellular band, and the third cellular band transceiver 231 sends uplink data to the first cellular band transceiver 211 or the second cellular band transceiver 221 by using an uplink subframe in the fourth-bandwidth cellular band.

Optionally, the cellular base station 21 may be further configured to adjust, according to bandwidth of the first-bandwidth millimeter wave band, a current uplink-downlink subframe configuration of the fourth-bandwidth cellular band to a target uplink-downlink subframe configuration;

the first cellular band transceiver 211 may be further configured to send information about the target uplink-downlink subframe configuration to the third cellular band transceiver 231;

the third cellular band transceiver 231 may be further configured to receive, according to the information about the target uplink-downlink subframe configuration, control plane data information sent by the first cellular band transceiver 211 or the second cellular band transceiver 221 by using the fourth-bandwidth cellular band with the target uplink-downlink subframe configuration; and the third cellular band transceiver 231 may be further configured to send, according to the information about the target uplink-downlink subframe configuration, uplink data to the first cellular band transceiver 211 or the second cellular band transceiver 221 by using the fourth-bandwidth cellular band with the target uplink-downlink subframe configuration.

For example, a current uplink-downlink subframe configuration of the fourth-bandwidth cellular band is uplink-downlink subframe configuration 3 defined in a communications protocol, that is, the current uplink-downlink subframe ratio of the fourth-bandwidth cellular band is 3:6. For example, the fourth-bandwidth cellular band is a frequency band with a bandwidth of 10 MHz, and then on the fourth-bandwidth cellular band, each radio frame includes 10 radio subframes, where subframes 2, 3, and 4 are uplink subframes, subframes 0, 5, 6, 7, 8, and 9 are downlink subframes, and subframe 1 is a switching subframe. Then, the cellular base station 21 may adjust the foregoing uplink-downlink subframe configuration 3 to uplink-downlink subframe configuration 0 defined in the communications protocol, that is, the adjusted uplink-downlink subframe ratio of the fourth-bandwidth cellular band is 6:2. For example, the fourth-bandwidth cellular band is a frequency band with a bandwidth of 10 MHz, and then on the fourth-bandwidth cellular band, each radio frame includes 10 radio subframes, where subframes 2, 3, 4, 7, 8, and 9 are configured as uplink subframes, subframes 0 and 5 are configured as downlink subframes, and subframes 1 and 6 are switching subframes.

The foregoing communications protocol may be specifically an LTE-Advanced protocol.

Optionally, the cellular base station 21 may be further configured to pre-estimate, according to bandwidth of the first-bandwidth millimeter wave band, uplink load on the user equipment 23, and adjust, according to the uplink load, a current uplink-downlink subframe configuration of the fourth-bandwidth cellular band to a target uplink-downlink subframe configuration. For example, the cellular base station 21 may acquire, by using the bandwidth of the first-bandwidth millimeter wave band, an uplink load volume that is used by the the user equipment 23 to feed back channel state information of a link on the millimeter wave band back, and adjust, according to the uplink load volume, the current uplink-downlink subframe configuration of the fourth-bandwidth cellular band to the target uplink-downlink subframe configuration. Alternatively, the cellular base station 21 acquires, according to a quantity of user equipment 23 that performs downlink communication by using the foregoing first-bandwidth millimeter wave band, uplink load on these user equipments 23 on a cellular band, and then adjusts, according to the uplink load volume, the current uplink-downlink subframe configuration of the fourth-bandwidth cellular band to the target uplink-downlink subframe configuration. Therefore, configuring an uplink-downlink subframe configuration of a cellular band may be implemented in a half-static manner according to load on a millimeter wave band and a cellular band.

Figure 4:
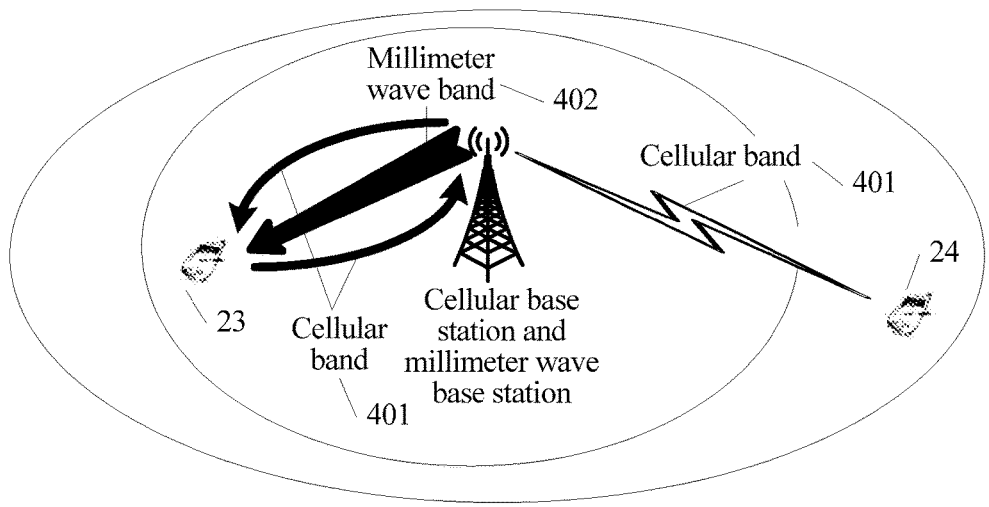
FIG. 4 to FIG. 6 are schematic diagrams of optional communication according to an embodiment of the present invention.

As an optional implementation manner, as shown in FIG. 4, the cellular base station 21 and the millimeter wave base station 22 may share a site (for example, a cell tower or a pole) to erect respective antennas of the cellular base station 21 and the millimeter wave base station 22, or share an antenna. The cellular base station 21 is connected to the millimeter wave base station 22 by using a circuit, that is, data exchange between the cellular base station 21 and the millimeter wave base station 22 may be exchange between high-speed circuits. Therefore, delay and capacity problems of a backhaul link do not exist between the cellular base station 21 and the millimeter wave base station 22, and transmission efficiency of the communications system may be improved.

In the implementation manner, a coverage area of the millimeter wave base station 22 may be consistent with a coverage area of the cellular base station 21. For example, both coverage areas of the millimeter wave base station 22 and the cellular base station 21 are a hot spot, and for example, the hot spot is an area with a radius of 200 meters to 500 meters. Certainly, the coverage area of the millimeter wave base station 22 may further be smaller than the coverage area of the cellular base station 21. For example, the millimeter wave base station 22 serves as a hot spot that covers an area with a radius of 200 meters to 500 meters, and the cellular base station 21 covers a wider area with a radius that reaches one kilometer to two kilometers. Therefore, the foregoing user equipment 23 may be user equipment that is located in the coverage area of the millimeter wave base station 22 and that is located in the coverage area of the cellular base station 21 at the collocation site.

In the implementation manner, the user equipment 23 in the coverage area of the millimeter wave base station 22 receives, by using the third cellular band transceiver 231, control plane information sent by the cellular base station 21 by using a cellular band 401, and receives, by using the millimeter wave band receiver 232, user plane information sent by the millimeter wave base station 22 by using a millimeter wave band 402. The third cellular band transceiver 231 transmits uplink data (including the control plane information and the user plane information) to the cellular base station 21 or the millimeter wave base station 22 by using the cellular band 401. User equipment 24 located beyond the coverage area of the millimeter wave base station 22 can communicate with the cellular base station 21 only by using the cellular band 401.

Figure 5:
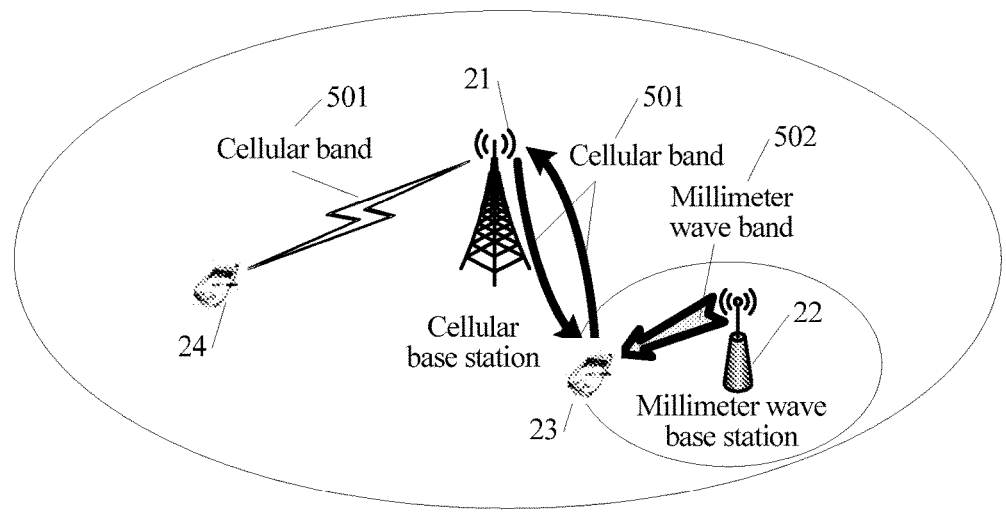

As an optional implementation manner, as shown in FIG. 5, the cellular base station 21 and the millimeter wave base station 22 are configured at different sites. In the configuration, the cellular base station 21 and the millimeter wave base station 22 are erected at different sites. The cellular base station 21 and the millimeter wave base station 22 may exchange data with each other by using a fiber-wired backhaul link or a millimeter wave wireless backhaul link. In this network architecture, one or more millimeter wave base stations 22 are located in the coverage area of the cellular base station 21. The user equipments 23 located in the coverage area of the millimeter wave base station 22 may perform data transmission with the cellular base station by using a cellular band.

The user equipment 23 in the coverage area of the millimeter wave base station 22 receives, by using the third cellular band transceiver 231, control plane information transmitted by the cellular base station 21 by using a cellular band 501, and receives, by using the millimeter wave band receiver 232, user plane information transmitted by the millimeter wave base station 22 by using a millimeter wave band 502. The third cellular band transceiver 231 transmits uplink data (including the control plane information and the user plane information) to the cellular base station 21 by using the cellular band 501. In this architecture, the millimeter wave base station 22 may be considered as a relay node, and both scheduling and transmission of scheduling information are completed by the cellular base station 21, where the scheduling may specifically refer to scheduling control plane data information and user plane data information to be sent to the user equipment 23. The user plane data information may be first moved to the millimeter wave base station 22 by using a backhaul link between the cellular base station 21 and the millimeter wave base station 22, and the cellular base station 21 schedules, by sending the scheduling information to the millimeter wave base station 22, the millimeter wave base station 22 to transmit the user plane data information to the user equipment by using the millimeter wave band 502. The user equipment 23 may further feed an acknowledgement message such as an acknowledgement (Acknowledgement, ACK) of the user equipment 23 back to the cellular base station 21 by using the cellular band 501, or feed an unacknowledged message such as a negative acknowledgement (Negative Acknowledgement, NACK) of the user equipment 23 back to the cellular base station 21 by using the cellular band 501. Then, the cellular base station 21 schedules, according to the information fed back by the user equipment 23, the millimeter wave base station 22 to perform corresponding retransmission. User equipment 24 located beyond the coverage area of the millimeter wave base station 22 can communicate with the cellular base station 21 only by using the cellular band 501.

Figure 6:
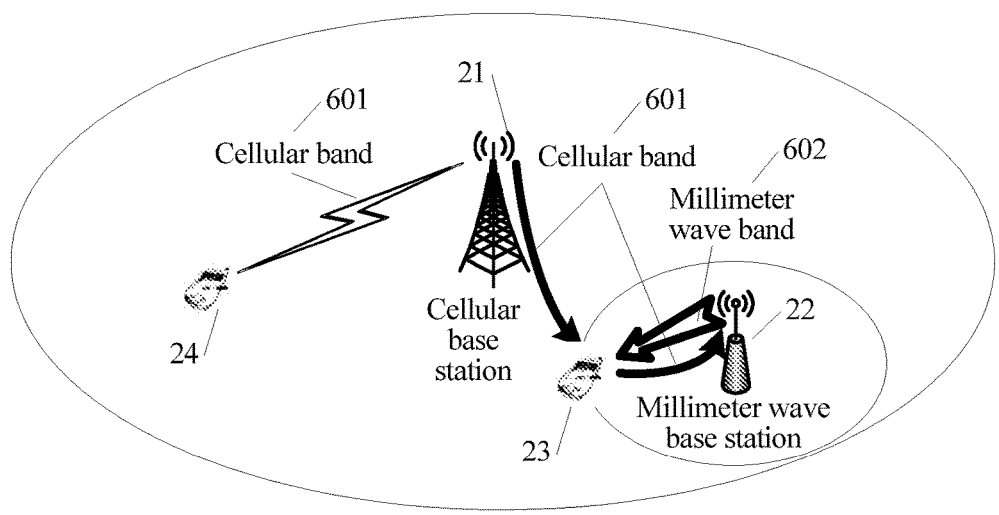

As an optional implementation manner, as shown in FIG. 6, the cellular base station 21 and the millimeter wave base station 22 are configured at different sites. In the configuration, the cellular base station 21 and the millimeter wave base station 22 are erected at different sites. The cellular base station 21 and the millimeter wave base station 22 may exchange data with each other by using a fiber-wired backhaul link or a millimeter wave wireless backhaul link. In this network architecture, one or more millimeter wave base stations 22 are located in the coverage area of the cellular base station 21.

The user equipment 23 in the coverage area of the millimeter wave base station 22 receives, by using the third cellular band transceiver 231, control plane information transmitted by the cellular base station 21 by using a cellular band 601, and receives, by using the millimeter wave band receiver 232, user plane information transmitted by the millimeter wave base station 22 by using a millimeter wave band 602. The third cellular band transceiver 231 transmits uplink data (including the control plane information and the user plane information) to the millimeter wave base station 22 by using the cellular band 601. In this architecture, the millimeter wave base station 22 may be considered as a relay node, and both scheduling and transmission of scheduling information are completed by the cellular base station 21, where the scheduling may specifically refer to scheduling control plane data information and user plane data information to be sent to the user equipment 23. The user plane data information may be first moved to the millimeter wave base station 22 by using a backhaul link between the cellular base station 21 and the millimeter wave base station 22, and the cellular base station 21 schedules, by sending the scheduling information to the millimeter wave base station 22, the millimeter wave base station 22 to transmit the user plane data information to the user equipment by using the millimeter wave band 602. The user equipment 23 may further feed an acknowledgement message such as an ACK of the user equipment 23 back to the millimeter wave base station 22 by using the cellular band 601, or feed an unacknowledged message such as a NACK of the user equipment 23 back to the millimeter wave base station 22 by using the cellular band 601. Then, the millimeter wave base station 22 performs corresponding retransmission according to the information fed back by the user equipment 23. User equipment 24 located beyond the coverage area of the millimeter wave base station 22 can communicate with the cellular base station 21 only by using the cellular band 601.

Figure 7:
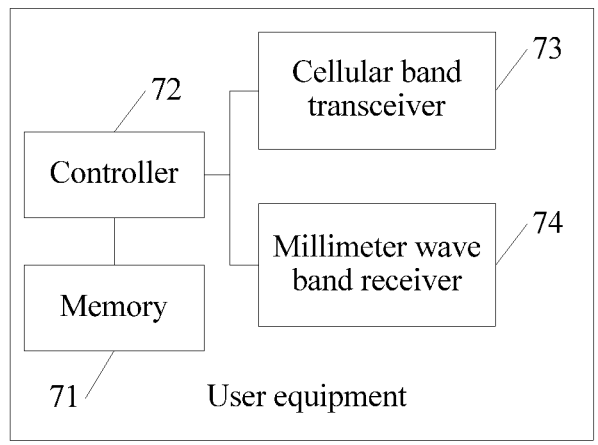
FIG. 7 is a schematic structural diagram of user equipment according to an embodiment of the present invention.

FIG. 7 is a schematic structural diagram of user equipment according to an embodiment of the present invention. As shown in FIG. 7, the user equipment includes a memory 71, a controller 72, a cellular band transceiver 73, and a millimeter wave band receiver 74, where the memory 71 is connected to the controller 72, and the controller 72 is further connected separately to the cellular band transceiver 73 and the millimeter wave band receiver 74; and the memory 71 is configured to store a group of program code and user data, and the controller 72 is configured to invoke programs stored in the memory 71 so as to control the cellular band transceiver 73 and the millimeter wave band receiver 74 to perform the following operations:

receiving, by the cellular band transceiver 73, control plane data information sent by a cellular base station or a millimeter wave base station by using a cellular band;

sending, by the cellular band transceiver 73, uplink data to the cellular base station or the millimeter wave base station by using a cellular band, and receiving, by the millimeter wave band receiver 74, user plane data information sent by the millimeter wave base station by using a millimeter wave band.

Optionally, the foregoing uplink data may specifically include at least one of the following:

control plane data information and user plane data information.

As an optional implementation manner, the cellular band transceiver 73 may be further configured to receive first identification information that is of a first-bandwidth millimeter wave band and that is sent by the cellular base station or the millimeter wave base station, where the first-bandwidth millimeter wave band is a millimeter wave band allocated to the user equipment by the cellular base station or the millimeter wave base station; and the millimeter wave band receiver 74 may be further configured to receive, according to the first identification information, user plane data information sent by the millimeter wave base station by using a millimeter wave band.

The foregoing first-bandwidth band may be specifically exclusively used for downlink data transmission of the user equipment. The foregoing first identification information may be specifically an ID number corresponding to the first-bandwidth millimeter wave band.

As an optional implementation manner, the user equipment communicates with the cellular base station on a cellular band in an FDD manner, and/or the user equipment communicates with the millimeter wave base station on a cellular band in the FDD manner;

the cellular band transceiver 73 may be further configured to receive control plane data information sent by the cellular base station or the millimeter wave base station by using a second-bandwidth cellular band;

the cellular band transceiver 73 may be further configured to send uplink data to the cellular base station or the millimeter wave base station by using a third-bandwidth cellular band;

the cellular band transceiver 73 is further configured to receive second identification information that is sent by the cellular base station or the millimeter wave base station and that is of the third-bandwidth cellular band whose uplink carrier is increased, where the third-bandwidth cellular band whose uplink carrier is increased is a third-bandwidth cellular band for which specific bandwidth or a specific quantity of carriers is increased, and the specific bandwidth or the specific quantity of carriers increased for the third-bandwidth cellular band is an uplink carrier increased for the user equipment by the cellular base station or the millimeter wave base station according to bandwidth of the first-bandwidth millimeter wave band; and the cellular band transceiver 73 may be further configured to send, according to the second identification information, uplink data to the cellular base station or the millimeter wave base station by using the third-bandwidth cellular band whose uplink carrier is increased.

For example, the foregoing third-bandwidth cellular band is bandwidth (for example, a 10 MHz-cellular band) allocated to the user equipment by a system in advance; when the cellular base station or the millimeter wave base station allocates the foregoing first-bandwidth millimeter wave band to the user equipment, the cellular base station or the millimeter wave base station may pre-estimate, according to the bandwidth of the first-bandwidth millimeter wave band, uplink load on the user equipment, and then determine whether the third-bandwidth cellular band can bear the uplink load on the user equipment; when it is determined that the third-bandwidth cellular band cannot bear the uplink load on the user equipment, the cellular base station or the millimeter wave base station may increase, according to the bandwidth of the first-bandwidth millimeter wave band and for the user equipment, an uplink carrier of the third-bandwidth cellular band.

The increasing an uplink carrier of the third-bandwidth cellular band may be specifically increasing bandwidth of the third-bandwidth cellular band, or increasing a quantity of uplink carriers of the third-bandwidth cellular band. For example, the third-bandwidth cellular band is a frequency band with a bandwidth of 10 MHz, and the cellular base station or the millimeter wave base station may adjust the third-bandwidth cellular band to 30 MHz, or use multiple 10 MHz-cellular bands as the foregoing third-bandwidth cellular band.

The foregoing second identification information may be specifically an ID number of the third-bandwidth cellular band whose uplink carrier is increased. The cellular base station or the millimeter wave base station sends the foregoing second identification information to the cellular band transceiver 73, and may specifically send the foregoing second identification information to the cellular band transceiver 73 by using RRC signaling. That is, increasing an uplink carrier of the third-bandwidth cellular band for the user equipment is implemented by using the RRC signaling.

As an optional implementation manner, the user equipment communicates with the cellular base station on a cellular band in a TDD manner, and/or the user equipment communicates with the millimeter wave base station on a cellular band in the TDD manner;

the cellular band transceiver 73 may be further configured to receive control plane data information sent by the cellular base station or the millimeter wave base station by using a fourth-bandwidth cellular band;

the cellular band transceiver 73 may be further configured to send uplink data to the cellular base station or the millimeter wave base station by using the fourth-bandwidth cellular band;

the cellular band transceiver 73 may be further configured to receive information that is about a target uplink-downlink subframe configuration of the fourth-bandwidth cellular band and that is sent by the cellular base station, where the target uplink-downlink subframe configuration of the fourth-bandwidth cellular band is an uplink-downlink subframe configuration adjusted by the cellular base station according to bandwidth of the first-bandwidth millimeter wave band;

the cellular band transceiver 73 may be further configured to receive, according to the information about the target uplink-downlink subframe configuration, control plane data information sent by the cellular base station or the millimeter wave base station by using the fourth-bandwidth cellular band with the target uplink-downlink subframe configuration; and the cellular band transceiver 73 may be further configured to send, according to the information about the target uplink-downlink subframe configuration, uplink data to the cellular base station or the millimeter wave base station by using the fourth-bandwidth cellular band with the target uplink-downlink subframe configuration.

For example, a current uplink-downlink subframe configuration of the fourth-bandwidth cellular band is uplink-downlink subframe configuration 3 defined in a communications protocol, that is, the current uplink-downlink subframe ratio of the fourth-bandwidth cellular band is 3:6. For example, the fourth-bandwidth cellular band is a frequency band with a bandwidth of 10 MHz, and then on the fourth-bandwidth cellular band, each radio frame includes 10 radio subframes, where subframes 2, 3, and 4 are configured as uplink subframes, subframes 0, 5, 6, 7, 8, and 9 are configured as downlink subframes, and subframe 1 is a switching subframe. Then, the cellular base station 21 may adjust the foregoing uplink-downlink subframe configuration 3 to uplink-downlink subframe configuration 0 defined in the communications protocol, that is, the adjusted uplink-downlink subframe ratio of the fourth-bandwidth cellular band is 6:2. For example, the fourth-bandwidth cellular band is a frequency band with a bandwidth of 10 MHz, and then on the fourth-bandwidth cellular band, each radio frame includes 10 radio subframes, where subframes 2, 3, 4, 7, 8, and 9 are configured as uplink subframes, subframes 0 and 5 are configured as downlink subframes, and subframes 1 and 6 are switching subframes.

The foregoing communications protocol may be specifically an LTE-Advanced protocol.

In the foregoing technical solution, user equipment receives, by using a cellular band transceiver, control plane data information sent by a cellular base station or a millimeter wave base station by using a cellular band; sends, by using the cellular band transceiver, uplink data to the cellular base station or the millimeter wave base station by using a cellular band; and then receives, by using a millimeter wave band receiver, user plane data information sent by the millimeter wave base station by using a millimeter wave band. Therefore, compared with the prior art in which user equipment needs to include one cellular band transceiver and one millimeter wave band transceiver, the user equipment needs to include only one cellular band transceiver and one millimeter wave band receiver to complete communication on a cellular band and a millimeter wave band, and in this embodiment of the present invention, a cost of the user equipment may be reduced.

Figure 8:
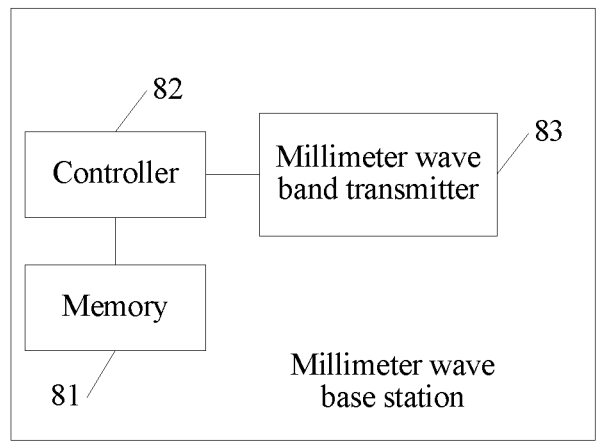
FIG. 8 is a schematic structural diagram of a millimeter wave base station according to an embodiment of the present invention.

FIG. 8 is a schematic structural diagram of a millimeter wave base station according to an embodiment of the present invention. As shown in FIG. 8, the millimeter wave base station includes: a memory 81, a controller 82, and a millimeter wave band transmitter 83, where the memory 81 is connected to the controller 82, and the controller 82 is further connected to the millimeter wave band transmitter 83; and the memory 81 is configured to store a group of program code, and the controller 82 is configured to invoke a program stored in the memory 83 so as to control the millimeter wave band transmitter 83 to perform the following operation:

sending, by the millimeter wave band transmitter 83, user plane data information to user equipment by using a millimeter wave band.

In this embodiment, downlink control plane data information of user equipment may be sent by a cellular base station to the user equipment by using a cellular band, and uplink data (for example, uplink control plane data information and uplink user plane data information) of the user equipment may be sent to the cellular base station by using a cellular band. Therefore, communication of the user equipment on a cellular band and a millimeter wave band is completed.

In the foregoing technical solution, because on a millimeter wave band, user equipment needs to receive only user plane data information sent by a millimeter wave band transmitter, that is, the user equipment needs only one millimeter wave band receiver to complete communication on a millimeter wave band, a cost of the user equipment may be reduced.

Figure 9:
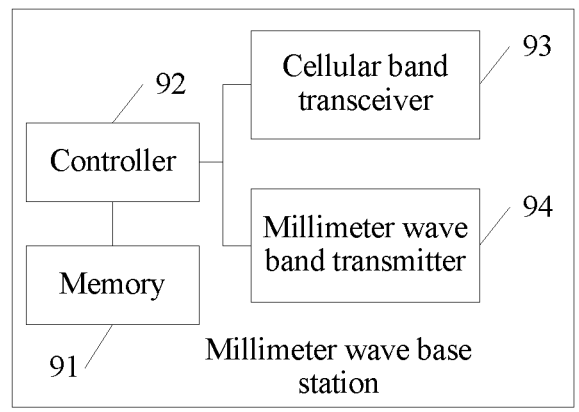
FIG. 9 is a schematic structural diagram of another millimeter wave base station according to an embodiment of the present invention.

FIG. 9 is a schematic structural diagram of a millimeter wave base station according to an embodiment of the present invention. As shown in FIG. 9, the millimeter wave base station includes: a memory 91, a controller 92, a cellular band transceiver 93, and a millimeter wave band transmitter 94, where the memory 91 is connected to the controller 92, and the controller 92 is further connected separately to the cellular band transceiver 93 and the millimeter wave band transmitter 94; and the memory 91 is configured to store a group of program code, and the controller 92 is configured to invoke programs stored in the memory 93 so as to control the cellular band transceiver 93 and the millimeter wave band transmitter 94 to perform the following operations:

sending, by the cellular band transceiver 93, control plane data information to the user equipment by using a cellular band; and/or receiving, by the cellular band transceiver 93, uplink data sent by the user equipment by using a cellular band; and sending, by the millimeter wave band transmitter 94, user plane data information to the user equipment by using a millimeter wave band.

When the cellular band transceiver 93 sends the control plane data information to the user equipment only by using a cellular band, the uplink data sent by the user equipment may be sent to the cellular base station; when the cellular band transceiver 93 receives only the uplink data sent by the user equipment by using a cellular band, the cellular base station may send the control plane data information to the user equipment by using a cellular band. Certainly, the millimeter wave base station may further perform data exchange with the cellular base station, for example, exchange of the foregoing user plane data information.

As an optional implementation manner, the controller 92 may be further configured to allocate a first-bandwidth millimeter wave band to the user equipment; the cellular band transceiver 93 may be further configured to send first identification information of the first-bandwidth millimeter wave band to the user equipment; and the millimeter wave band transmitter 94 may be further configured to send, according to the first identification information, user plane data information to the user equipment by using the first-bandwidth millimeter wave band.

Specifically, after the user equipment establishes a connection to the cellular base station by using a cellular band, the cellular base station sends, to the foregoing millimeter wave base station, indication information of allocating bandwidth of the millimeter wave band to the user equipment, after receiving the indication information, the controller 92 measures a millimeter wave band, and the controller 92 then allocates the foregoing first-bandwidth (for example, 200 MHz) millimeter wave band to the user equipment according to a measurement result.

The foregoing first-bandwidth band may be specifically exclusively used for downlink data transmission of the user equipment. The foregoing first identification information may be specifically an ID number corresponding to the first-bandwidth millimeter wave band.

As an optional implementation manner, the user equipment communicates with the cellular base station on a cellular band in an FDD manner;

the cellular band transceiver 93 may be further configured to send control plane data information to the user equipment by using a second-bandwidth cellular band; and/or the cellular band transceiver 93 may be further configured to receive uplink data sent by the user equipment by using a third-bandwidth cellular band;

the controller 92 may be further configured to increase, according to bandwidth of the first-bandwidth millimeter wave band and for the user equipment, specific bandwidth or a specific quantity of carriers for an uplink carrier of the third-bandwidth cellular band;

the cellular band transceiver 93 may be further configured to send, to the user equipment, second identification information of the third-bandwidth cellular band whose uplink carrier is increased; and the cellular band transceiver 93 may be further configured to receive, according to the second identification information, uplink data sent by the user equipment by using the third-bandwidth cellular band whose uplink carrier is increased.

For example, the foregoing third-bandwidth cellular band is bandwidth (for example, a 10 MHz-cellular band) allocated to the user equipment by a system in advance; when the controller 92 allocates the foregoing first-bandwidth millimeter wave band to the user equipment, the controller 92 may acquire, according to the first-bandwidth millimeter wave band, uplink load on the user equipment, and then determine whether the third-bandwidth cellular band can bear the uplink load on the user equipment; when it is determined that the third-bandwidth cellular band cannot bear the uplink load on the user equipment, the controller 92 may increase, according to the bandwidth of the first-bandwidth millimeter wave band and for the user equipment, an uplink carrier of the third-bandwidth cellular band.

The increasing an uplink carrier of the third-bandwidth cellular band may be specifically increasing bandwidth of the third-bandwidth cellular band, or increasing a quantity of uplink carriers of the third-bandwidth cellular band. For example, the third-bandwidth cellular band is a frequency band with a bandwidth of 10 MHz, and the controller 92 may adjust the third-bandwidth cellular band to a frequency band with a bandwidth of 30 MHz, or use multiple 10 MHz-cellular bands as the foregoing third-bandwidth cellular band.

The foregoing second identification information may be specifically an ID number of the third-bandwidth cellular band whose uplink carrier is increased. The cellular band transceiver 93 sends the foregoing second identification information to the user equipment, and may specifically send the foregoing second identification information to the user equipment by using RRC signaling. That is, increasing an uplink carrier of the third-bandwidth cellular band for the user equipment is implemented by using the RRC signaling.

Figure 10:
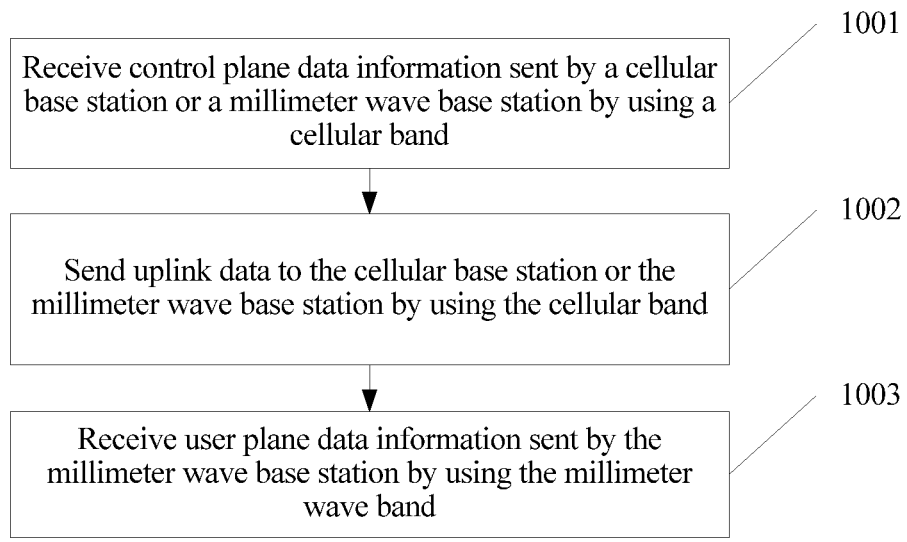
FIG. 10 is a schematic flowchart of a communications method according to an embodiment of the present invention.

FIG. 10 is a schematic flowchart of a communications method according to an embodiment of the present invention. As shown in FIG. 10, the method includes the following steps:

1001. Receive control plane data information sent by a cellular base station or a millimeter wave base station by using a cellular band, where the control plane data information includes first identification information of a millimeter wave band.

1002. Send uplink data to the cellular base station or the millimeter wave base station by using a cellular band, where the uplink data includes channel state information of the millimeter wave band identified by the first identification information.

Optionally, when receiving the foregoing uplink data, the cellular base station may transmit, to the millimeter wave base station, the channel state information included in the uplink data, so that the millimeter wave base station sends user plane data information to the user equipment by using a millimeter wave band. When receiving the foregoing uplink data, the millimeter wave base station may send, according to the channel state information, the user plane data information to the user equipment by using a millimeter wave band.

1003. Receive user plane data information sent by the millimeter wave base station by using the millimeter wave band.

As an optional implementation manner, the millimeter wave band may include a first-bandwidth millimeter wave band, where the first-bandwidth millimeter wave band a millimeter wave band allocated by the cellular base station or the millimeter wave base station.

In the foregoing technical solution, control plane data information sent by a cellular base station or a millimeter wave base station by using a cellular band is received, uplink data is sent to the cellular base station or the millimeter wave base station by using a cellular band, and user plane data information sent by the millimeter wave base station by using a millimeter wave band is received. Therefore, compared with the prior art in which user equipment needs to include one cellular band transceiver and one millimeter wave band transceiver, the user equipment needs to include only one cellular band transceiver and one millimeter wave band receiver to complete communication on a cellular band and a millimeter wave band, and in this embodiment, a cost of the user equipment may be reduced.

Figure 11:
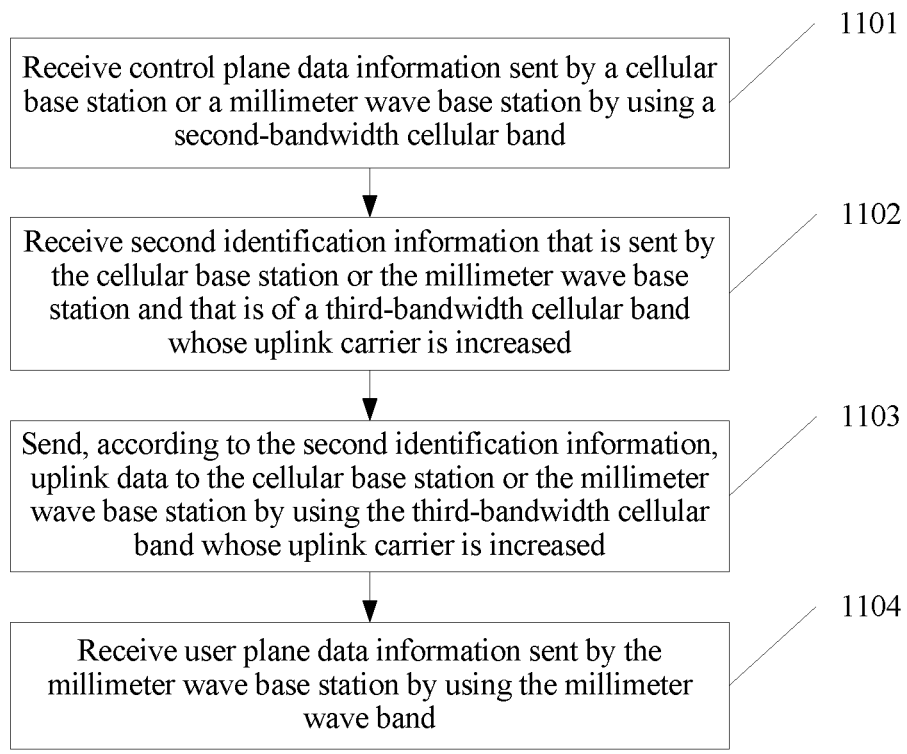
FIG. 11 is a schematic flowchart of another communications method according to an embodiment of the present invention.

FIG. 11 is a schematic flowchart of another communications method according to an embodiment of the present invention. As shown in FIG. 11, the method includes the following steps:

1101. Receive control plane data information sent by a cellular base station or a millimeter wave base station by using a second-bandwidth cellular band.

1102. Receive second identification information that is sent by the cellular base station or the millimeter wave base station and that is of a third-bandwidth cellular band whose uplink carrier is increased, where the third-bandwidth cellular band whose uplink carrier is increased is a third-bandwidth cellular band for which specific bandwidth or a specific quantity of carriers is increased, and the specific bandwidth or the specific quantity of carriers increased for the third-bandwidth cellular band is increased by the cellular base station or the millimeter wave base station according to a first-bandwidth millimeter wave band.

1103. Send, according to the second identification information, uplink data to the cellular base station or the millimeter wave base station by using the third-bandwidth cellular band whose uplink carrier is increased.

1104. Receive user plane data information sent by the millimeter wave base station by using the millimeter wave band.

In the foregoing technical solution, based on the foregoing embodiment, in addition to reducing a cost of user equipment, communication may be further implemented on a cellular band in an FDD manner, and an uplink carrier used for transmitting uplink data to a cellular base station or a millimeter wave base station may be adjusted by the cellular base station or the millimeter wave base station.

Figure 12:
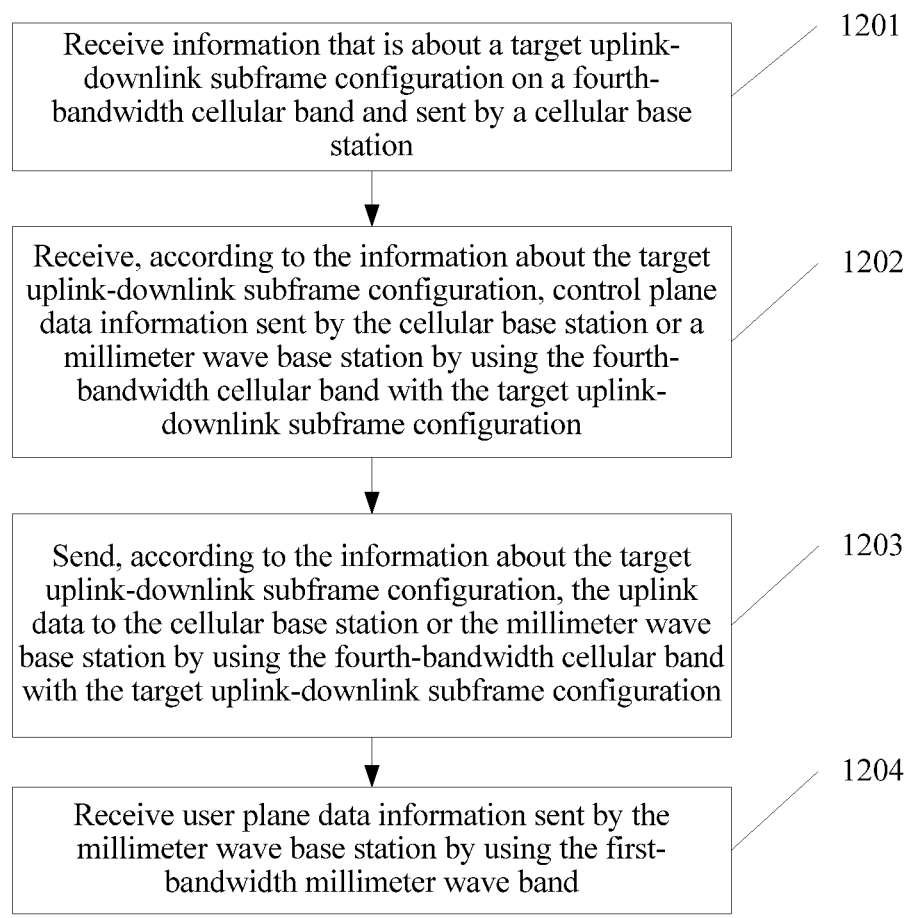
FIG. 12 is a schematic flowchart of another communications method according to an embodiment of the present invention.

FIG. 12 is a schematic flowchart of another communications method according to an embodiment of the present invention. As shown in FIG. 12, the method includes the following steps:

1201. Receive information that is about a target uplink-downlink subframe configuration of a fourth-bandwidth cellular band and that is sent by a cellular base station, where the target uplink-downlink subframe configuration of the fourth-bandwidth cellular band is an uplink-downlink subframe configuration adjusted by the cellular base station according to bandwidth of a first-bandwidth millimeter wave band.

1202. Receive, according to the information about the target uplink-downlink subframe configuration, control plane data information sent by the cellular base station or a millimeter wave base station by using the fourth-bandwidth cellular band with the target uplink-downlink subframe configuration.

1203. Send, according to the information about the target uplink-downlink subframe configuration, uplink data to the cellular base station or the millimeter wave base station by using the fourth-bandwidth cellular band with the target uplink-downlink subframe configuration.

1204. Receive user plane data information sent by the millimeter wave base station by using the first-bandwidth millimeter wave band.

In the foregoing technical solution, based on the foregoing embodiment, in addition to reducing a cost of user equipment, communication may be further implemented on a cellular band in a TDD manner, and an uplink-downlink subframe configuration of a frequency band used for communication on a cellular band with a cellular base station or a millimeter wave base station may be adjusted by the cellular base station according to bandwidth of a millimeter wave band.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (Read-Only Memory, ROM), a random access memory (Random Access Memory, RAM), or the like.

What is disclosed above is merely embodiments of the present invention, and certainly is not intended to limit the protection scope of the present invention. Therefore, equivalent variations made in accordance with the claims of the present invention shall fall within the scope of the present invention.

What is claimed is:

1. A communications system comprising:
 a cellular base station comprising a first cellular band transceiver;
 a millimeter wave base station connected to the cellular base station by a transmission link, with the millimeter wave base station comprising a second cellular band transceiver and a millimeter wave band transmitter;
 user equipment comprising a third cellular band transceiver and a millimeter wave band receiver, wherein, the user equipment communicates with at least one of the cellular base station and the millimeter wave base station on the cellular band in a frequency division duplex (FDD) manner;

the third cellular band transceiver of the user equipment is configured to (a) receive control plane data information sent by the first cellular band transceiver or the second cellular band transceiver using a cellular band and (b) send uplink data to the first cellular band transceiver of the cellular base station or the second cellular band transceiver of the millimeter wave base station, using the cellular band, wherein the cellular base station or the millimeter wave base station is further configured to
 a) allocate a first-bandwidth millimeter wave band to the user equipment,
 b) send, to the third cellular band transceiver, first identification information of the first-bandwidth millimeter wave band,
 c) increase, according to bandwidth of the first-bandwidth millimeter wave band and for the user equipment, a bandwidth or a quantity of carriers for an uplink carrier of the third-bandwidth cellular band, and
 d) send, to the third cellular band transceiver, second identification information of the third-bandwidth cellular band whose uplink carrier is increased;

the millimeter wave band receiver of the user equipment is configured to (a) receive user plane data information sent by the millimeter wave band transmitter of the millimeter wave base station, using the millimeter wave band, and (b) receive, according to the first identification information, the user plane data information sent by the millimeter wave band transmitter using the first-bandwidth millimeter wave band;

the second cellular band transceiver is further configured to send, to the third cellular band transceiver, the second identification information of the third-bandwidth cellular band whose uplink carrier is increased; and the third cellular band transceiver is further configured to (a) receive the control plane data information sent by the first cellular band transceiver or the second cellular band transceiver using a second-bandwidth cellular band and (b) send, according to the second identification information, the uplink data to the first or second cellular band transceiver using a third-bandwidth cellular band whose uplink carrier is increased.

2. The system according to claim 1, wherein the cellular base station or the millimeter wave base station is further configured to:
 pre-estimate uplink load on the user equipment according to bandwidth of the first-bandwidth millimeter wave band; and
 increase, according to the uplink load for the user equipment, a bandwidth or a quantity of carriers for an uplink carrier of the third-bandwidth cellular band.

3. User equipment for communicating with at least one of a cellular base station and a millimeter wave base station on a cellular band in a frequency division duplex (FDD) manner the user equipment comprising:
 a cellular band transceiver configured to receive first identification information that is of a first-bandwidth millimeter wave band and sent by a cellular or millimeter wave base station, wherein the first-bandwidth millimeter wave band is a millimeter wave band allocated to the user equipment by the cellular or millimeter wave base station;
 a millimeter wave band receiver configured to receive, according to the first identification information, user plane data information sent by the millimeter wave base station using a millimeter wave band;
 a memory configured to store program code; and
 a controller connected to the memory, to the cellular band transceiver, and to the millimeter wave band receiver, with the controller being configured to execute the program code to:
  a. receive, by the cellular band transceiver, control plane data information sent by a cellular base station or a millimeter wave base station using a cellular band;
  b. send, by the cellular band transceiver, uplink data to the cellular base station or the millimeter wave base station using the cellular band;
  c. receive, by the millimeter wave band receiver, user plane data information sent by the millimeter wave base station using a millimeter wave band;
  d. receive the control plane data information sent by the cellular or millimeter wave base station using a second-bandwidth cellular band;
  e) send the uplink data to the cellular or millimeter wave base station using a third-bandwidth cellular band;
  f) receive second identification information sent by the cellular or millimeter wave base station that is of the third-bandwidth cellular band whose uplink carrier is increased,
   wherein the third-bandwidth cellular band whose uplink carrier is increased is a third-bandwidth cellular band for which a bandwidth or a quantity of carriers is increased, and the bandwidth or the quantity of carriers increased for the third-bandwidth cellular band is an uplink carrier increased for the user equipment by the cellular or millimeter wave base station according to a bandwidth of the first-bandwidth millimeter wave band; and
  g) send, according to the second identification information, the uplink data to the cellular or millimeter wave base station using the third-bandwidth cellular band whose uplink carrier is increased.

4. The user equipment of claim 3, wherein the controller is further configured to provide before receiving the control plane data information sent by the cellular base station or the millimeter wave base station using the cellular band:
 receiving information about a target uplink-downlink subframe configuration of a fourth-bandwidth cellular band sent by the cellular base station, wherein the target uplink-downlink subframe configuration of the fourth-bandwidth cellular band is an uplink-downlink subframe configuration adjusted by the cellular base station according to bandwidth of the first-bandwidth millimeter wave band.

5. The user equipment of claim 3, wherein the controller is further configured to receive the control plane data information sent by the cellular base station or the millimeter wave base station using the cellular band as follows:
 receive, according to the information about the target uplink-downlink subframe configuration, the control plane data information sent by the cellular base station or the millimeter wave base station using a fourth-bandwidth cellular band with the target uplink-downlink subframe configuration.

6. The user equipment of claim 3, wherein the controller is further configured to send the uplink data to the cellular base station or the millimeter wave base station using the cellular band as follows:
send, according to the information about the target uplink-downlink subframe configuration and the identification information, the uplink data to the cellular base station or the millimeter wave base station using a fourth-bandwidth cellular band with the target uplink-downlink subframe configuration.

7. A millimeter wave base station for communicating with user equipment wherein the user equipment communicates with the base station on a cellular band in a frequency division duplex (FDD) manner, the base station comprising:
a millimeter wave band transmitter;
a cellular band transceiver;
a memory configured to store program code; and
a controller connected to the memory, to the cellular band transceiver, and to the millimeter wave band transmitter, with the controller being configured to allocate a first-bandwidth millimeter wave band to the user equipment and execute the program code to:
 a) send first identification information of a first-bandwidth millimeter wave band to the user equipment;
 b) send user plane data information to the user equipment using the first-bandwidth millimeter wave band according to the first identification information;
 c) send control plane data information to the user equipment using a second-bandwidth cellular band;
 d) increase, according to a bandwidth of the first-bandwidth millimeter wave band for the user equipment, a bandwidth or a quantity of carriers for an uplink carrier of a third-bandwidth cellular band;
 e) send, to the user equipment, second identification information of the third-bandwidth cellular band whose uplink carrier is increased; and
 f) receive uplink data sent by the user equipment using the third-bandwidth cellular band whose uplink carrier is increased.

8. The millimeter wave base station of claim 7, wherein the controller is further configured to:
pre-estimate uplink load on the user equipment according to bandwidth of the first-bandwidth millimeter wave band; and
increase, according to the uplink load for the user equipment, a bandwidth or a quantity of carriers for an uplink carrier of the third-bandwidth cellular band.

9. A communications method comprising:
receiving, in a communication system, control plane data information sent by a cellular base station or a millimeter wave base station using a cellular band, wherein the control plane data information comprises first identification information of a first-bandwidth millimeter wave band allocated by the cellular or millimeter wave base station, wherein the control plane data information is received using a second-bandwidth cellular band;
receiving, in the communication system, second identification information sent by the cellular or millimeter wave base station using a third-bandwidth cellular band whose uplink carrier bandwidth or quantity of carriers is increased by the cellular or millimeter wave base station according to the first-bandwidth millimeter wave band;
sending, in the communication system, uplink data to the cellular or millimeter wave base station using the third-bandwidth cellular band whose uplink carrier is increased wherein the uplink data comprises channel state information of the millimeter wave band identified by the first identification information; and
receiving, in the communication system, user plane data information sent by the millimeter wave base station using the millimeter wave band.

10. The method according to claim 9,
before receiving the control plane data information sent by the cellular base station or the millimeter wave base station using the cellular band, the method further comprises:
receiving information about a target uplink-downlink subframe configuration of a fourth-bandwidth cellular band sent by the cellular base station, wherein the target uplink-downlink subframe configuration of the fourth-bandwidth cellular band is an uplink-downlink subframe configuration adjusted by the cellular base station according to bandwidth of the first-bandwidth millimeter wave band;
receiving the control plane data information sent by the cellular base station or the millimeter wave base station using the cellular band comprises:
receiving, according to the information about the target uplink-downlink subframe configuration, the control plane data information sent by the cellular base station or the millimeter wave base station using the fourth-bandwidth cellular band with the target uplink-downlink subframe configuration; and
sending the uplink data to the cellular base station or the millimeter wave base station using the cellular band comprises:
sending, according to the information about the target uplink-downlink subframe configuration and the identification information, the uplink data to the cellular base station or the millimeter wave base station using the fourth-bandwidth cellular band with the target uplink-downlink subframe configuration.

* * * * *